UNITED STATES PATENT OFFICE.

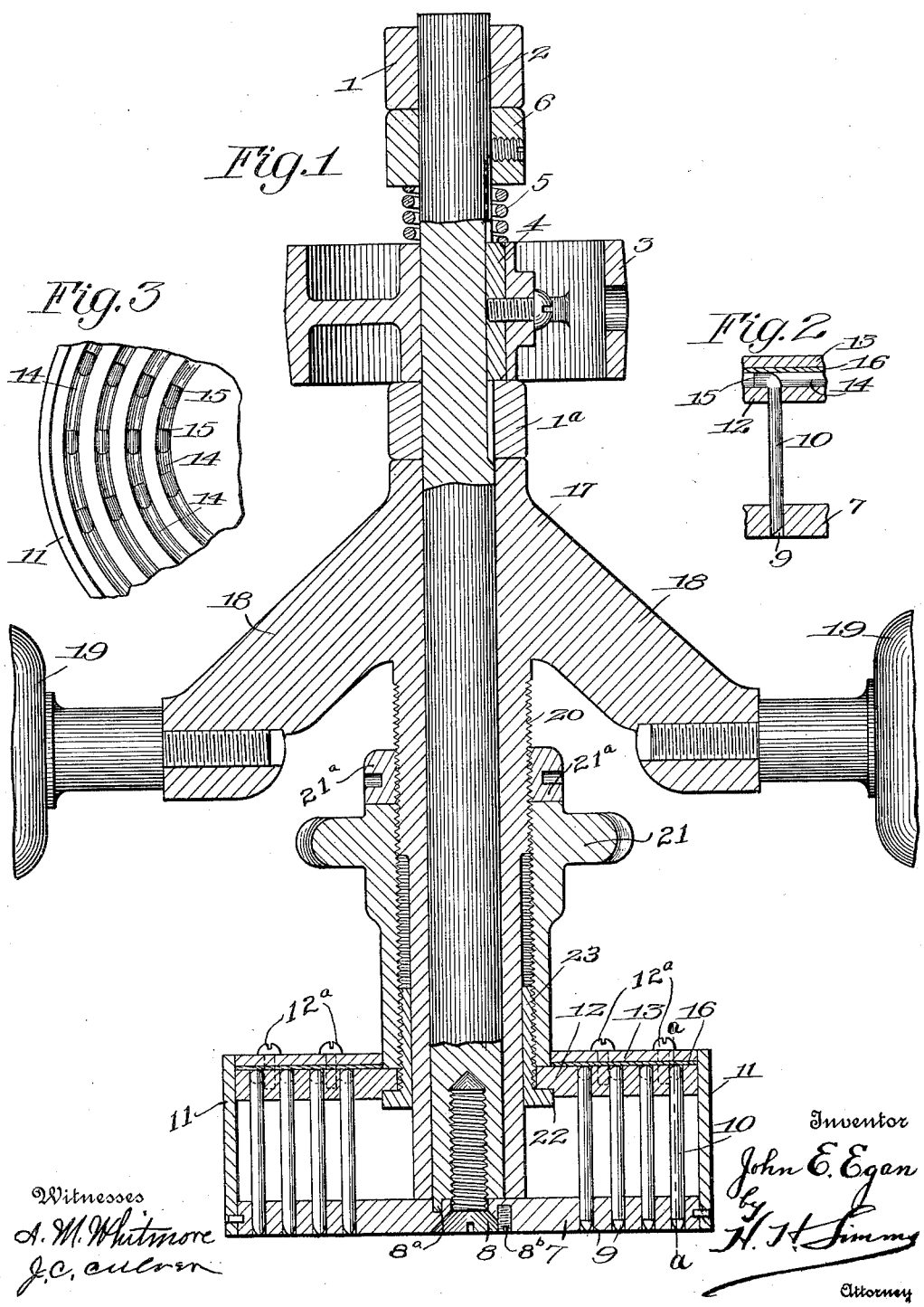

JOHN E. EGAN, OF ROCHESTER, NEW YORK.

ABRADING-TOOL.

1,071,219. Specification of Letters Patent. Patented Aug. 26, 1913.

Application filed June 25, 1912. Serial No. 705,790.

*To all whom it may concern:*

Be it known that I, JOHN E. EGAN, of Rochester, in the county of Monroe and State of New York, have invented a new and useful Improvement in Abrading-Tools, which improvement is fully set forth in the following specification and shown in the accompanying drawings.

The present invention relates to abrading tools, that is, to tools for removing the surfaces of wood, stone or other material, and an object of the invention is to provide a construction having teeth as distinguished from a sand papering surface, the teeth being removable and preferably adjustable so that provision may be made for the repair of the tool.

To these and other ends the invention consists in certain parts and combinations of parts all of which will be hereinafter described, the novel features being pointed out in the appended claims.

In the drawings: Figure 1 is a vertical axial section through an abrading tool constructed in accordance with the present invention; Fig. 2 is a detail view of one of the teeth on the line $a$—$a$, Fig. 3; and Fig. 3 is a detail view of a portion of the lower tooth carrying disk.

In the illustrated embodiment of the invention, there is employed a supporting member of any suitable construction having portions 1 and 1ª in which is guided a shaft 2 which, preferably, is axially movable in the supporting parts 1 and 1ª and has a pulley or other driving member 3 keyed thereto at 4 to permit axial movement in the pulley, the latter being supported between the supporting parts 1 and 1ª to turn in engagement therewith, and a spring 5 being interposed between the pulley and a collar 6 that is rigid on the shaft 2 so as to normally hold the shaft 2 in an elevated position.

Carried by the shaft 2 is a rotary head comprising preferably a supporting disk or plate 7 held against turning on the lower end of the shaft 2 by a screw or other fastening device 8 and a lug 8ª extending into the disk, the screw 8 being held against turning by a set screw 8ᵇ. This plate is preferably provided with a number of openings or perforations 9 in which are fitted the teeth 10 of the tool, said teeth each being preferably circular in cross section and beveled so as to provide a sharp lower edge. Preferably, these teeth are adjustable, and, to this end, they are arranged upon a carrier forming part of the rotary head and located above the perforated disk 7, said carrier, through the medium of a means to be described, being adjustable relatively to the plate or member 7 in order to project the cutting ends of these teeth more or less from the supporting face of the disk 7, and being guided within a sleeve or flange 11 projecting upwardly from the periphery of the disk 7 for the purpose of housing the teeth.

The carrier, preferably, embodies a lower disk 12 and an upper disk 13, held together by screws 12ª, the lower disk being provided on its upper side with a series of concentric annular grooves 14 and with openings through which the teeth 10 project, the upper ends or heads 15 of the teeth being deflected laterally and lying within the grooves 14 in proximity to the openings through which the teeth extend. The upper disk 13 holds the ends 15 of the teeth within the grooves while said deflected ends, by engagement with the walls of the grooves, prevent the turning of the teeth in their openings. A packing 16 of leather or other material may be interposed between the disks 12 and 13.

For holding the tool against the work, an operating frame 17 may be provided which is preferably of tubular construction and surrounds the shaft 2 from the supporting part 1ª to the perforated disk 7, its lower end bearing upon the disk to exert pressure thereon. This frame 17 may be provided with two arms 18 extending laterally therefrom in opposite directions and having hand pieces 19 at their free ends.

The adjusting means for the carrier for the teeth 10 may be supported on the frame 17 and to this end the frame is externally threaded at 20 and is engaged by an internally threaded sleeve 21 which coöperates at its lower end with the upper face of the lower disk 12 and which may be engaged at its upper end by a lock nut 21ª to hold it in its adjusted position. The under face of disk 12 is engaged by an annular flange 22 on an externally threaded bushing 23 which surrounds the frame 17 and engages within the lower end of sleeve 21 thus holding the sleeve and the carrier together but permitting the sleeve to turn on the carrier.

The operation of the invention is as follows: The work piece is placed below the head and the operator, after causing the head to rotate, presses downwardly on the frame 17 causing the disk 7 and its teeth 10 to coöperate with the work. After the work piece has received the proper treatment, the hand pieces 19 are released permitting the head to be raised by the spring 5. To adjust the amount of projection of the teeth from the disk 7, the sleeve 21 is turned so as to effect the adjustment of the disks 12 and 13.

An abrading tool constructed in accordance with this invention is very effective for removing the surface from most any material. Its teeth may be removed for repair or sharpening and may be adjusted to secure any desired length.

The construction and the operation of the tool are simple while the cost of manufacture is inexpensive.

Another feature of this construction is that the tool is self cleaning owing to the fact that the teeth work through a perforated plate.

What I claim as my invention and desire to secure by Letters Patent is:

1. An abrading tool comprising a rotary head having a flat supporting face adapted to bear against the work, teeth carried by the head and projecting from said face, and means for simultaneously moving said teeth relatively to the face to project them slightly from said face to secure an abrasive or rasping action.

2. An abrading tool comprising a flat supporting face adapted to bear against the work and provided with perforations, a plurality of teeth projecting through said perforations, and a common carrier for the teeth, the carrier and the supporting face being relatively adjustable to cause the teeth to project slightly from the supporting face to secure an abrasive or rasping action.

3. An abrading tool comprising a flat disk constructed to bear against the work and provided with perforations and with an upwardly extending flange, a driving shaft rigidly connected to the disk, a carrier surrounding the shaft and adjustable within said flange relatively to the shaft, and teeth projecting from said carrier through the perforations and means for holding the carrier in its adjusted position.

4. An abrading tool comprising a supporting face adapted to bear against the work, a shaft connected to said supporting face, a carrier, a plurality of teeth on the carrier, projecting through the supporting face, a frame in which the shaft turns, and an adjusting device between the frame and the carrier.

5. An abrading tool comprising a supporting face adapted to bear against the work, a shaft connected to said supporting face, a carrier, a plurality of teeth on the carrier, projecting through the supporting face, a frame in which the shaft turns, and an adjusting device between the frame and the carrier, comprising a sleeve having a turning movement on one of said parts and screw threaded engagement with the other part.

6. An abrading tool comprising a perforated disk adapted to bear against the work, a shaft connected to said disk, a carrier surrounding the shaft, teeth on the carrier extending through the perforations of the disk, a frame in which the shaft turns provided with a hand piece, and an adjusting sleeve surrounding the shaft, connecting the frame and the carrier and having screw threaded engagement with one of said parts and turning movement on the other part.

7. An abrading tool comprising a perforated disk, a flange projecting from one side of the disk, a shaft secured to the disk, a frame in which the shaft turns, a carrier surrounding the shaft and movable within the flange of the disk, a plurality of teeth projecting from the carrier and extending through the perforations of the disk, and a sleeve having screw threaded engagement with the frame and secured to but adapted to turn on the carrier.

8. In an abrading tool, the combination with a perforated member, of a plurality of headed teeth, and a carrier for the teeth embodying two disks one of which has the teeth extending therethrough and the other of which holds the heads of the teeth against the first named disk.

9. In an abrading tool, the combination with a perforated member, of a plurality of teeth having laterally extending heads, and a carrier for the teeth embodying two disks, one of which is provided with a series of concentric grooves and perforations intersecting the grooves, the teeth extending through the perforations and the heads of the teeth lying in the grooves, and the other of said disks holding the heads of the teeth in the grooves.

JOHN E. EGAN.

Witnesses:
HAROLD H. SIMMS,
ADA M. WHITMORE.

Copies of this patent may be obtained for five cents each, by addressing the "Commissioner of Patents, Washington, D. C."